US010061800B2

(12) United States Patent
Hartig et al.

(10) Patent No.: US 10,061,800 B2
(45) Date of Patent: Aug. 28, 2018

(54) EMBEDDING DATABASE PROCEDURES IN DATA-DRIVEN APPLICATIONS

(71) Applicants: Martin Hartig, Walldorf (DE); Helmut Prestel, Bad Schoenborn (DE); Rolf Hammer, Walldorf (DE); Kai Baumgarten, Walldorf (DE); Sigrid Wortmann, Walldorf (DE); Christiane Kettschau, Walldorf (DE); Stefan Werner, Hamburg (DE); Ralf Wendelgass, Walldorf (DE)

(72) Inventors: Martin Hartig, Walldorf (DE); Helmut Prestel, Bad Schoenborn (DE); Rolf Hammer, Walldorf (DE); Kai Baumgarten, Walldorf (DE); Sigrid Wortmann, Walldorf (DE); Christiane Kettschau, Walldorf (DE); Stefan Werner, Hamburg (DE); Ralf Wendelgass, Walldorf (DE)

(73) Assignee: SAP SE, Walldorf (DE)

( * ) Notice: Subject to any disclaimer, the term of this patent is extended or adjusted under 35 U.S.C. 154(b) by 573 days.

(21) Appl. No.: 14/548,628

(22) Filed: Nov. 20, 2014

(65) Prior Publication Data

US 2016/0078042 A1    Mar. 17, 2016

Related U.S. Application Data

(60) Provisional application No. 62/050,511, filed on Sep. 15, 2014.

(51) Int. Cl.
G06F 17/30    (2006.01)
G06F 9/445    (2018.01)
(Continued)

(52) U.S. Cl.
CPC ........ *G06F 17/30386* (2013.01); *G06F 8/656* (2018.02); *G06F 9/44521* (2013.01);
(Continued)

(58) Field of Classification Search
CPC ......... G06F 17/30386; G06F 17/30289; G06F 17/30297; G06F 8/67; G06F 8/30; G06F 8/47; G06F 9/44251; G06F 11/3466
See application file for complete search history.

(56) References Cited

U.S. PATENT DOCUMENTS 5,826,077 A * 10/1998 Blakeley ................. G06F 8/315
7,558,738 B1 * 7/2009 Flatt ....................... G06F 19/328
                                                       705/2

(Continued)

OTHER PUBLICATIONS

Final, "SQL Server—Introduction to CLR—Simple Example of CLR Stored Procedure", https://blog.sqlauthority.com/2008/10/19/sql-server-introduction-to-clr-simple-example-of-clr-stored-procedure/, Oct. 19, 2008.*

(Continued)

*Primary Examiner* — Jay A Morrison
(74) *Attorney, Agent, or Firm* — Schwegman Lundberg & Woessner, P.A.

(57) ABSTRACT

Disclosed herein are systems and methods for embedding database procedures in data-driven software applications written in a language different from the database-procedure language. For example, in some embodiments, the hosting application may be written in ABAP whereas the database procedure may be written in SQLScript. In various embodiments, the database procedures are encapsulated in specially marked methods of the host application, which, when called at runtime, cause the database procedures to be created in a database catalog and executed on a database server.

17 Claims, 5 Drawing Sheets

(51) Int. Cl.
  *G06F 8/656* (2018.01)
  *G06F 8/41* (2018.01)
  *G06F 8/30* (2018.01)
  *G06F 11/34* (2006.01)

(52) U.S. Cl.
  CPC .. *G06F 17/30289* (2013.01); *G06F 17/30297* (2013.01); *G06F 8/30* (2013.01); *G06F 8/47* (2013.01); *G06F 11/3466* (2013.01)

(56) References Cited

U.S. PATENT DOCUMENTS

2003/0225856 A1* 12/2003 Pietrowski ............ G06F 19/322
                                                        709/217
2004/0019587 A1* 1/2004 Fuh ................... G06F 17/30471

OTHER PUBLICATIONS

Tiwari, "How to create a stored procedure for SQL Server from C# code?", stackoverflow.com, http://stackoverflow.com/questions/23822754/how-to-create-a-stored-procedure-for-sql-server-from-c-sharp-code, May 23, 2014.*

Kavitha, "how to check if stored procedure exists or not in sql server using c# code", https://stackoverflow.com/questions/13797744/how-to-check-if-stored-procedure-exists-or-not-in-sql-server-using-c-sharp-code, Dec. 10, 2012.*

Jignesh Trivedi, Code-First Stored Procedure Entity Framework 6.0, http://www.c-sharpcorner.com/UploadFile/ff2f08/code-first-stored-procedure-entity-framework-6-0/, Sep. 10 2014. (Year: 2014).*

* cited by examiner

```
METHOD MY_DB_PROC

BY DATABASE PROCEDURE

FOR DATABASE <db-type>

[LANGUAGE <db language>]

USING TABLE|VIEW|METHOD <name>.

"" native SQLScript here

ENDMETHOD.
```

EMBEDDING DATABASE PROCEDURES IN DATA-DRIVEN APPLICATIONS

CROSS-REFERENCE TO RELATED APPLICATION

This application claims priority to and the benefit of U.S. Provisional Patent Application No. 62/050,511, filed on Sep. 15, 2014, which is hereby incorporated herein by reference in its entirety.

TECHNICAL FIELD

This document relates generally to systems and methods for accessing databases, for example, methods and systems that incorporate database procedures.

BACKGROUND

Many businesses and other enterprises nowadays store vast amounts of data in databases, often using commercially available database platforms in conjunction with software applications capable of accessing and processing the data to extract meaningful information therefrom in support of various business processes. For example, software applications for enterprise resource planning, customer relationship management, supplier relationship management, supply chain management, and product lifecycle management are widely used across many industries. With a growing need for real-time data access and increasing amounts of data, a trend has emerged to move data-processing functionality closer towards the database to reduce the frequency with which the database is accessed by external programs. This "code push-down" can be accomplished through the use of database procedures that are executed within the database itself. Database procedures, however, are limited in the types of operations they can perform.

BRIEF DESCRIPTION OF THE DRAWINGS

The present disclosure illustrates embodiments of the disclosure by way of example and not limitation, and with reference to the following drawings.

DETAILED DESCRIPTION

The description that follows includes systems, methods, techniques, instruction sequences, and computing machine program products that embody illustrative example embodiments of the disclosure. For the purposes of explanation, numerous specific details are set forth in order to provide an understanding of various example embodiments of the inventive subject matter. It will be evident, however, to those skilled in the art, that example embodiments of the inventive subject matter may be practiced without these specific details. In general, well-known instruction instances, protocols, structures, and techniques have not been shown in detail.

In general, the subject matter disclosed herein relates to the integration of stored database procedures (herein also referred to as "database procedures" or "stored procedures") with or into a software application designed to access a database in order to retrieve data therefrom and/or store data therein, and/or to process the data, e.g., in accordance with a business process. In various example embodiments, the database is maintained on a database server, and the software application is created and executed on an application server in communication therewith. The database procedures are ultimately stored and executed in the database. Conventionally, the database-procedure source code may be defined on the database server as well (e.g., using a suitable code editor), and integrated with the application via separately created database-procedure proxies. By contrast, example embodiments described herein facilitate embedding database procedures directly in the application source code, despite the fact that, in general, the language in which the host application is written (hereinafter also referred to as the "host language") differs from that used to define the embedded database procedure(s). This capability may eliminate the need for the programmer to use different toolsets for developing the host application and database procedures, providing a more seamless development experience.

Figure 1:
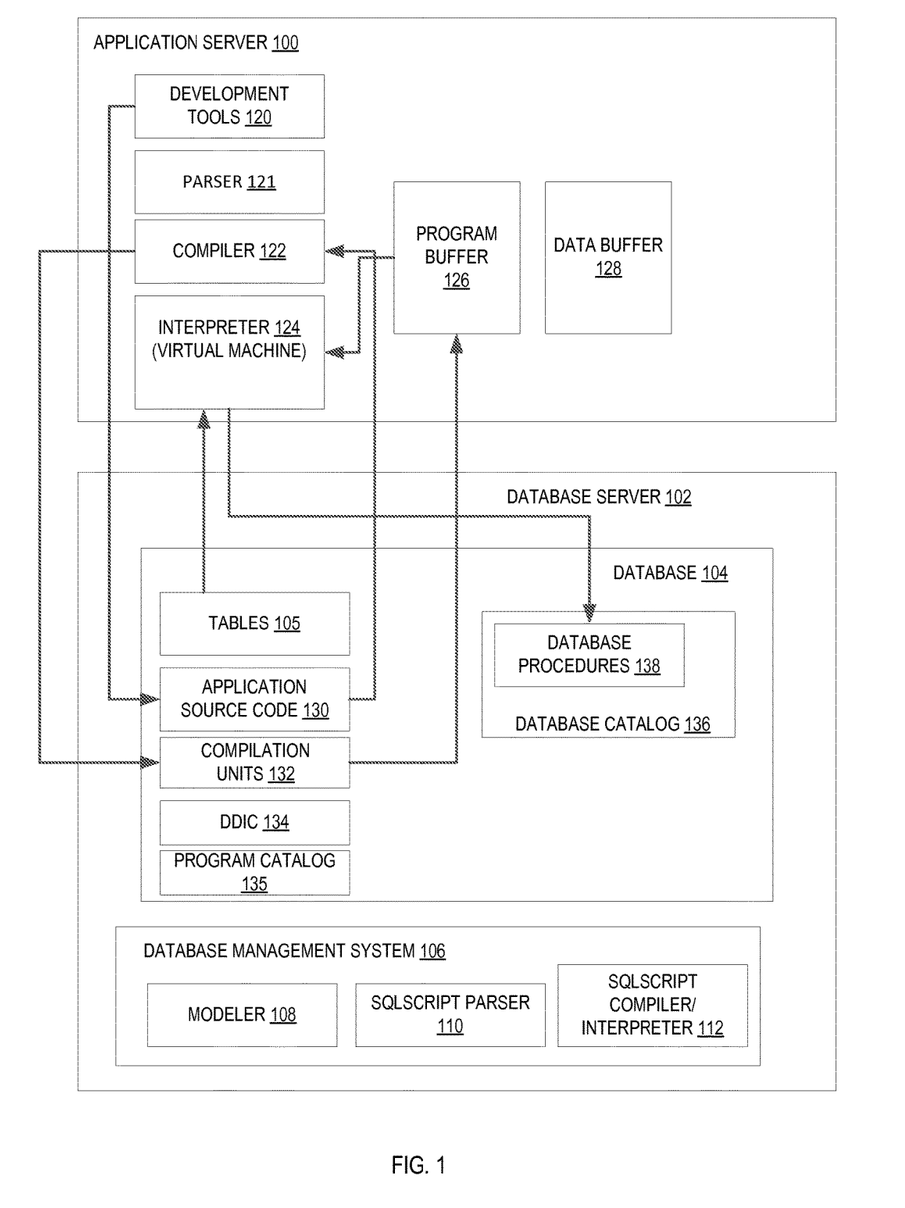
FIG. 1 is a block diagram illustrating a system, in accordance with an example embodiment, including application and database servers.

FIG. 1 is a block diagram illustrating a system, in accordance with an example embodiment, including application and database servers. The system is shown to include an application server 100 and an in-memory database server 102, which may be connected via a wired or wireless network (not shown). The database server 102 stores a database 104 which includes business data, generally organized in tables 105, as well as an associated database management system (DBMS) 106. The DBMS 106 may include various software programs that interact with users, other software applications, and the database 104; these programs may include, e.g., a modeler 108 (which may be used to define, e.g., tables, views, indexes, stored procedures, and other database objects), an SQLScript parser 110, and an SQLScript compiler or interpreter 112 (depending on the particular database). The application server 100 may include software development tools 120, including, e.g., a code editor used to define the application source code as well as data types and data structures (including, e.g., scalars, tables, and views) used therein (which may be separately stored in the Data Dictionary (DDIC)). Further, the application server 100 may have a parser 121 that serves to check the code syntax and dependencies, and a compiler 122 that translates application source code into compilation units written in an intermediate language; in some example embodiments, the parser 121 and the compiler 122 are integrated into one component. The application server 100 may also have an interpreter 124 that executes the compilation units, a program buffer 126 in which the compilation units are held during runtime, and a data buffer 128 in which frequently accessed and/or infrequently changed data may be temporarily stored to limit database accesses during execution of an application. In various example embodiments, the database 104 may double as a repository for the application source code 130, the compilation units 132, a data dictionary (DDIC) 134 that separately stores the data structures and types used in the application, and a program catalog 135 that stores metadata about the program objects (e.g., source code objects and compilation units). The database 104 further includes a database catalog 136 that stores metadata about the tables 105 (including their organization, available views, etc.) as well as the database procedures 138 (or, in some example embodiments, more precisely descriptions of the database procedures that are a prerequisite for database-procedure execution).

In various example embodiments, the applications server 100 is an Advanced Business Application Programming (ABAP) application server that hosts one or more software applications written in the ABAP language developed by SAP SE (headquartered in Walldorf, Germany). (In ABAP, the compilation units are also referred to as "loads.") The database server 102 may provide, for example, the SAP-developed High-Performance Analytic Appliance (HANA™) database platform. HANA databases currently support database procedures written either in SQLScript (which herein refers to an SQL-based scripting language developed by SAP for HANA) or LLANG (or "L," which is a database language developed by SAP for HANA that focuses on arithmetic and calculations rather than data access and manipulation, and has similarities to the C programming language). It is to be understood, of course, that the scope of the present disclosure is not limited to ABAP and HANA, but is also applicable to host applications and database procedures written in other programming languages, and to other types of application servers and database platforms (e.g., Oracle Database, IBM DB2, Microsoft SQL Server, or the like).

Figure 2:
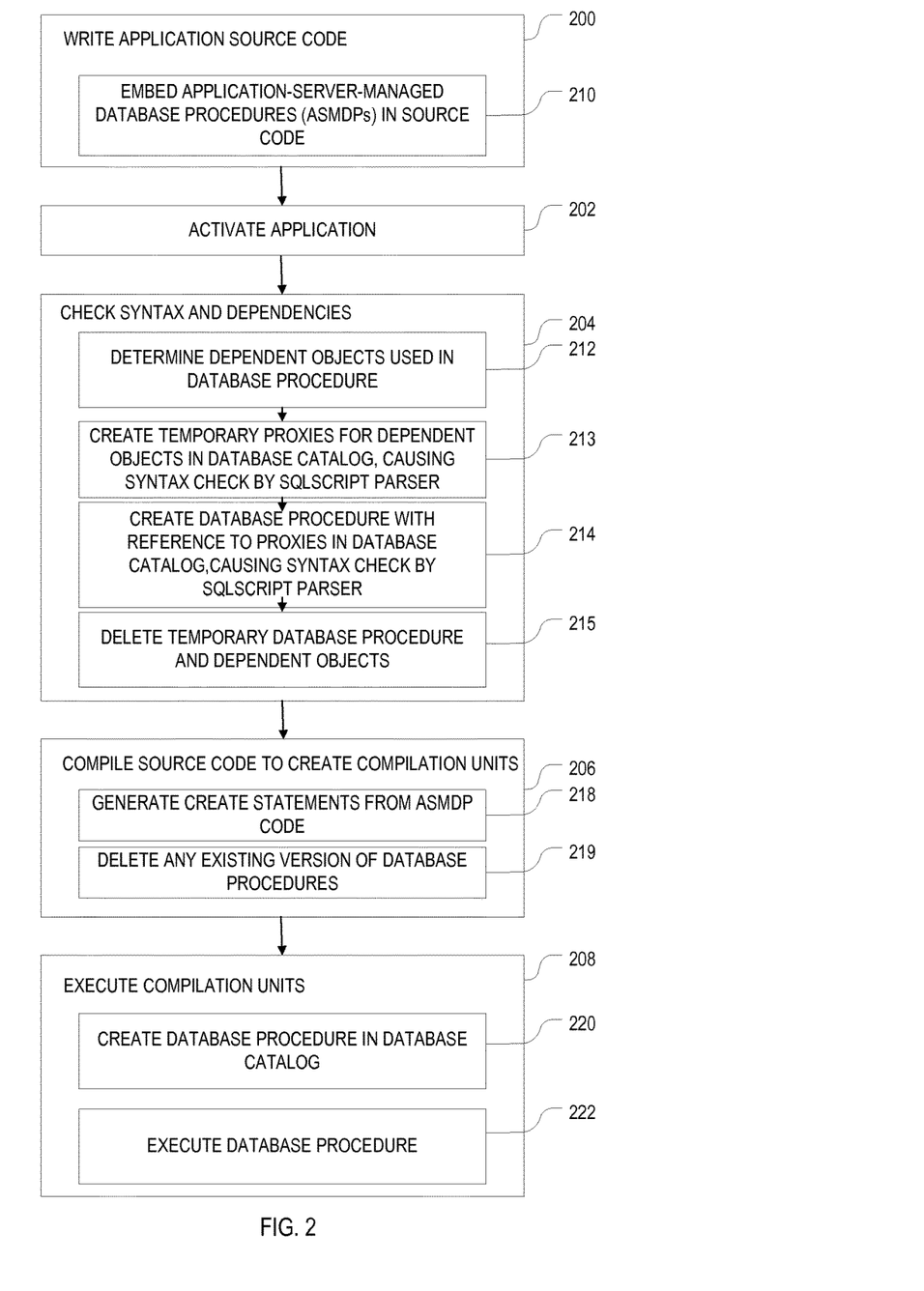
FIG. 2 is a flow chart illustrating a method, in accordance with an example embodiment, for creating and executing applications with embedded database.

FIG. 2 is a flow chart illustrating a method, in accordance with an example embodiment, for creating and executing applications with embedded database procedures. The method may be deployed on the system of FIG. 1 and, accordingly, is described merely by way of example with reference thereto. To provide some context for the integration of database procedures into host applications, consider first the general process of creating and executing a host application. Application source code may be written on the application server 100, using the development tools 120 available thereon (see operation 200). The application source code is typically (but not necessarily) stored in the database 104. An application under development may be stored as an inactive version. To deploy the application in practice, the developer activates the application as shown at operation 202. Only one active version can exist at a given point in time; accordingly, activating an application overwrites any previously activated version of that application (e.g., a program with the same name). As shown at operation 204, activation may trigger syntax and dependency checks, followed by compilation of the source code (see operation 206). The compilation units 132 may be stored in the database 104. In some example embodiments, the compilation process is "lazy," meaning that dependent objects (such as other applications, classes, and/or function groups referenced in the source code) are not compiled at this time. To execute the application, the compilation units 132 are loaded into the program buffer 126. An interpreter 124 (which may be part of a Virtual Machine) then sequentially executes the statements contained in the compilation units 132 (see operation 208), accessing the database tables 105 as needed. As dependent objects are encountered during runtime, the Virtual Machine checks for the existence of corresponding compilation units, and, if none are found, triggers the compilation of the dependent objects to create the requisite compilation units.

The example method shown in FIG. 2 also illustrates how the use of database procedures can be integrated into this workflow. In various example embodiments, the developer can embed database procedures directly into the host-application source code (operation 210) as "application-server-managed database procedures (ASMDPs)." The database procedures are encapsulated in special methods ("ASMDP methods") declared as database procedures, e.g., by virtue of a suitable tag (such as "by stored procedure" or "by database procedure" or "by database function"). The methods have a regular interface (like other methods written the host language), as illustrated in the example code snippet in FIG. 3. The body of the method, however, is implemented in SQLScript, or, more generally, in the native database procedure language used by the database server 102. To support multiple database platforms, alternative example embodiments may employ, instead of the database-specific native procedure language, an OpenSQLScript language that is either limited to functionality common to multiple respective database procedure languages or properly mapped to database-specific features. The ASMDP methods may be methods of a regular class of the host language; for example, the class may include both regular methods and ASMDP methods. In some example embodiments, ASMDPs are required to be public and static; this may serve to avoid the complexity of mapping the concepts of object orientation and inheritance to database procedures.

Figure 3:
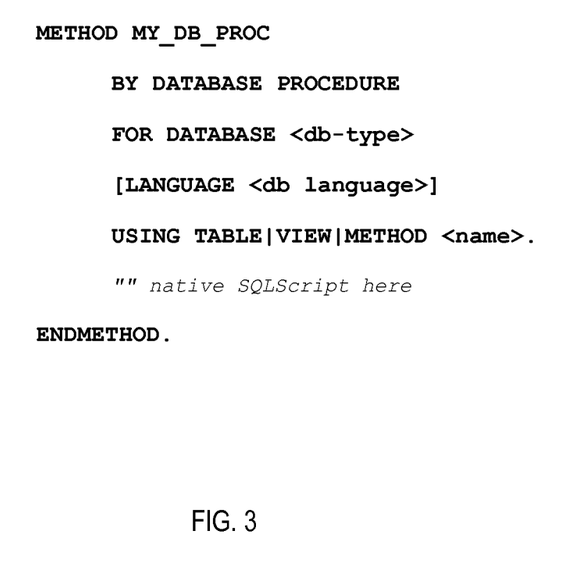
FIG. 3 is a code snippet illustrating a syntax for embedding database procedures in accordance with various example embodiments.

FIG. 3 is a code snippet illustrating a syntax for embedding database procedures in accordance with various example embodiments. In the example syntax shown in FIG. 3, the host application is written in ABAP. The interface includes "METHOD" followed by the method's name, the tag "BY DATABASE PROCEDURE," which marks the method as an ASMDP method (in the context of ABAP also referred to as an ABAP-managed database procedure (AMDP) method), a declaration of the database used by the procedure (e.g., the word "FOR" followed by the database name, e.g., HDB (for HANA)), a declaration of the database procedure language (e.g., SQLScript), and a declaration of the objects (e.g., tables, views, and methods) used in the database procedure (e.g., the word "USING" followed by the type of object that is being declared, followed by the name of that particular object). In some example embodiments, the declaration of the database procedure language is mandatory; in other example embodiments, it is optional, and a default language is assumed absent an explicit declaration. Similarly, the explicit forward declaration of the dependent objects may be mandatory or optional, depending on whether a reliable method for ascertaining dependent objects is available. The various declarations are followed by the body of the database procedure, written in the native database procedure language, and the closing bracket "ENDMETHOD."

Returning to the method shown in FIG. 2, in the course of checking the application source code, the embedded database procedures may be checked by exploiting inherent database functionality, in particular the SQLScript parser 110 on the database server 102. For this purpose, the parser 121 of the application server 100 may attempt to cause temporary runtime artifacts of the database procedure and its dependent objects (such as other database procedures and tables) to be created in the database catalog 136 (see operation 212) (e.g., by issuing a "create procedure" statement for execution by the DBMS 106); this attempt triggers (by virtue of the inherent database functionality) a syntax check by the SQLScript parser 110, and its success is contingent upon the syntactic correctness of the database procedure and its dependent objects.

In more detail, in accordance with one example embodiment, checking the database procedure for syntactic correctness may involve, first, identifying any dependent objects (including any dependent database procedures) used in the database procedure (see operation 212), either based on the forward declarations of dependent objects contained in the ASMDP method itself or by using the well-known "get_procedure_objects" method (or a similar method). Thereafter, as shown at operation 213, temporary proxies of the identified dependent objects, or "stubs" (which include the object name and signature, but omit, in the case of database procedures, the object body), are then created in the database catalog 136 (e.g., using the "create procedure" statement executed by the DBMS 106), provided they are syntactically correct. To avoid interference with any active versions of these objects, the proxies are created with different names. In case of multiple levels of dependencies (e.g., if dependent objects call further dependent objects), the objects are created in an order depending on their dependency level, beginning with the deepest level (e.g., with objects that do not have dependent objects themselves). Once proxies for all dependent objects have been successfully created, references to dependent objects in the body of the database procedure at issue are substituted for by references to the corresponding proxies, and the database procedure is then itself created in the database catalog 136 as shown in operation 214. Again, in the example embodiment, the database procedure is created under a different name to avoid confusion with any different, active version of the procedure. If the creation of the database procedure or any of its dependent objects is unsuccessful, an error message is sent to the parser 121 on the application server 100. Otherwise, the database procedure including its dependencies, and the corresponding ASMDP method itself, can be assumed to be syntactically correct, and no errors are to be expected when it is called during later execution of the embedding host application. Following the syntax check, as shown in operation 215, the temporary database procedure and the temporary dependent-object proxies are deleted, or "dropped," in the database catalog 136 (e.g., using the "drop procedure" statement).

In various example embodiments, compilation of the application source code (see operation 206) does not result in the creation of runtime database procedures. Rather, for each ASMDP, a "create procedure" statement (as is well-known to those familiar with the SQL data description language (DDL)) may be generated in or in association with the compilation units (see operation 218). (While semantically belonging to the compilation units, the DDL statements may be stored separately, with suitable references in the compilation units.) In addition to generating the create statements, compilation of the application source code may involve checking whether any of the embedded database procedures already exist in the catalog; if so, and if a comparison reveals that an embedded database procedure differs from the already existing one, this procedure is deleted (e.g., using the "drop procedure" statement executed by the DBMS 106) to prevent the use of outdated database procedures (see operation 219).

When, during later execution of the compilation units (at operation 208) by the interpreter 124 of the application server 100, an ASMDP is called, an attempt at its execution is made; this attempt results in a specific error if the called database procedure does not yet exist, triggering its creation or "activation" (and the creation/activation of any not yet existing dependent procedures or other objects) in the database catalog 136 based on the stored DDL statements (see operation 220), followed by its execution directly in the database (see operation 222). Thus, ASMDPs may be created upon being called during first-time execution of the compilation units by the interpreter 124 (or, alternatively, at some earlier time). Thereafter, the already existing database procedures are used. Execution of the database procedures is based on their respective entries in the database catalog 136 and accomplished with conventional database means (represented in FIG. 1 by the SQLScript Compiler/Interpreter 112), which may vary from database to database. In some example embodiments, the database procedures undergo a compilation process (e.g., as part of their activation in the database catalog 136) that results in separately stored runtime artifacts. In other example embodiments, the database procedures are interpreted (as the term is understood by those of ordinary skill in the art). Combinations of compilation and interpretation are also possible.

Advantageously, facilitating the incorporation of database procedures, written in the native database language, into database-accessing host applications (such as, e.g., ABAP programs) eliminates the need for application developers to generate program code objects with two separate development tools (such as, e.g., one for ABAP and one for the database procedures), which may require login under two separate user accounts, and the cumbersome task of manually creating interfaces and mapping data types between these program code objects. Moreover, the present framework for integrating database procedures into a host language is robust with regard to any changes to syntax of the database procedure language, as the parsing and execution of the database procedure remains the responsibility of the database itself.

Modules, Components, and Logic

Certain example embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or in any suitable combination thereof. For example, a hardware module may include dedicated circuitry or logic that is permanently configured to perform certain operations. For example, a hardware module may be a special-purpose processor, such as a field-programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In example embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 4:
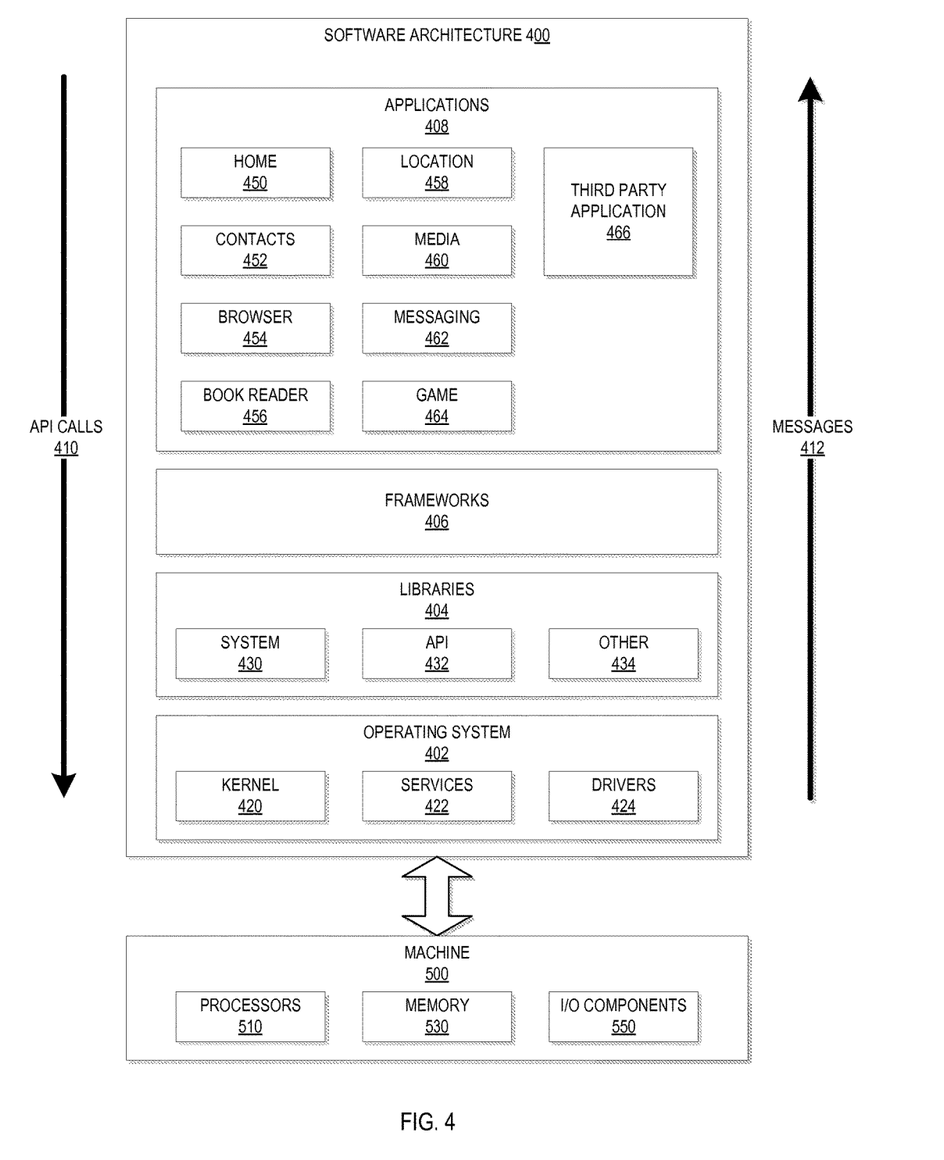
FIG. 4 is a block diagram illustrating a software architecture, in accordance with an example embodiment, that may be installed on a machine.

FIG. 4 is a block diagram illustrating an architecture of software 400, portions or the entirety of which may be installed on one or more of the application server 100 and/or the database server 102 depicted in FIG. 1. FIG. 4 is merely a non-limiting example of a software architecture and it will be appreciated that many other architectures may be implemented to facilitate the functionality described herein. The software 400 may be executing on hardware such as machine 500 of FIG. 5 that includes processors 510, memory 530, and I/O components 550. In the example architecture of FIG. 4, the software 400 may be conceptualized as a stack of layers where each layer may provide particular functionality. For example, the software 400 may include layers such as an operating system 402, libraries 404, frameworks 406, and applications 408. Operationally, the applications 408 may invoke application programming interface (API) calls 410 through the software stack and receive messages 412 in response to the API calls 410.

The operating system 402 may manage hardware resources and provide common services. The operating system 402 may include, for example, a kernel 420, services 422, and drivers 424. The kernel 420 may act as an abstraction layer between the hardware and the other software layers. For example, the kernel 420 may be responsible for memory management, processor management (e.g., scheduling), component management, networking, security settings, and so on. The services 422 may provide other common services for the other software layers. The drivers 424 may be responsible for controlling and/or interfacing with the underlying hardware. For instance, the drivers 424 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 404 may provide a low-level common infrastructure that may be utilized by the applications 408. The libraries 404 may include system libraries 430 (e.g., C standard library) that may provide functions such as memory allocation functions, string manipulation functions, mathematic functions, and the like. In addition, the libraries 404 may include API libraries 432 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 404 may also include a wide variety of other libraries 434 to provide many other APIs to the applications 408.

The frameworks 406 may provide a high-level common infrastructure that may be utilized by the applications 408. For example, the frameworks 406 may provide various graphic user interface (GUI) functions, high-level resource management, high-level location services, and so forth. The frameworks 406 may provide a broad spectrum of other APIs that may be utilized by the applications 408, some of which may be specific to a particular operating system or platform.

The applications 408 include a home application 450, a contacts application 452, a browser application 454, a book reader application 456, a location application 458, a media application 460, a messaging application 462, a game application 464, and a broad assortment of other applications such as third-party application 466. In a specific example, the third-party application 466 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third-party application 466 may invoke the API calls 410 provided by the operating system 402 to facilitate functionality described herein.

Example Machine Architecture and Machine-Readable Medium

Figure 5:
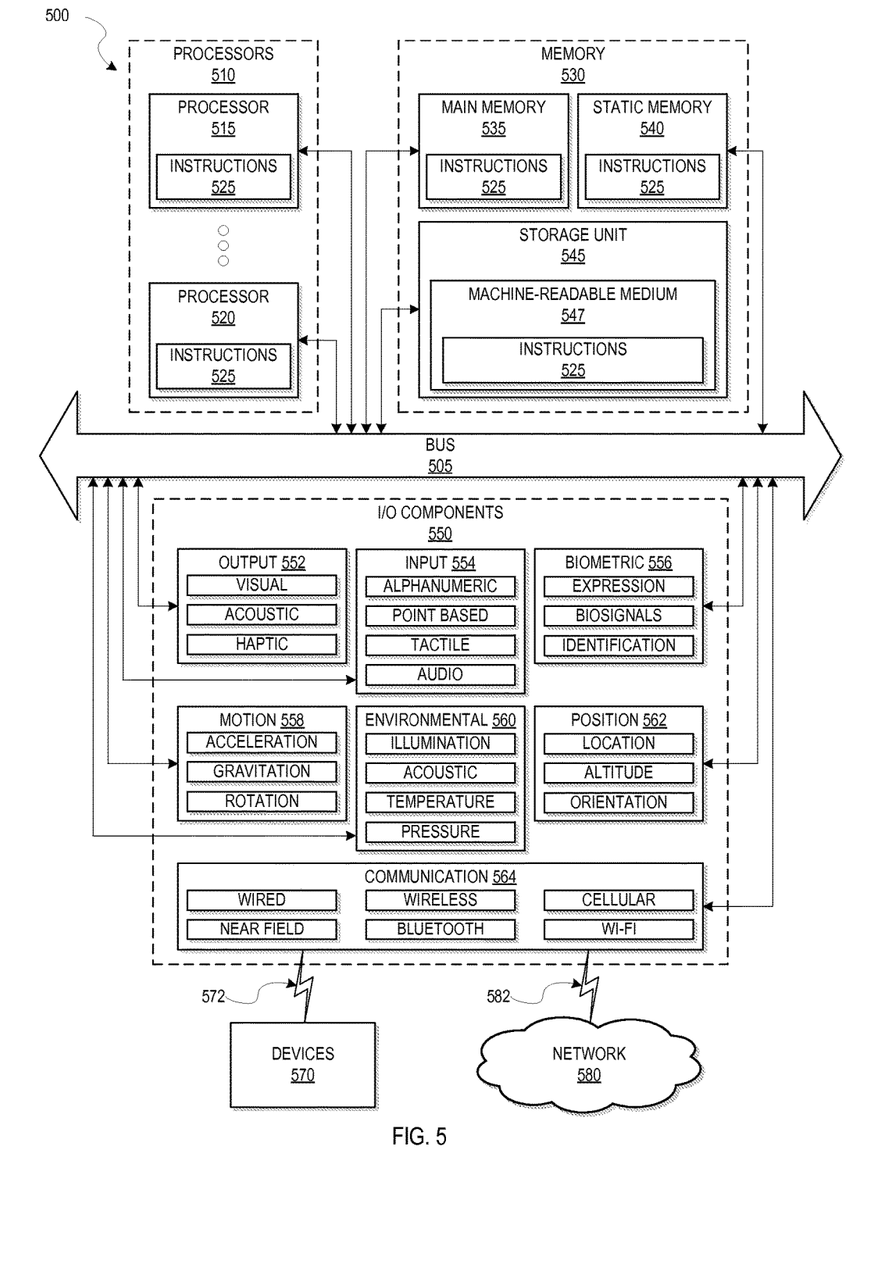
FIG. 5 is a diagrammatic representation of a machine in the form of a computer system within which a set of instructions may be executed for causing the machine to perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 525 (e.g., software, a program, an application, an applet, an app, or other executable code) for causing the machine 500 to perform any one or more of the methodologies discussed herein may be executed. In alternative example embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but be not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 525, sequentially or otherwise, that specify actions to be taken by machine 500. Further, while only a single machine 500 is illustrated, the term "machine" shall also be taken to include a collection of machines 500 that individually or jointly execute the instructions 525 to perform any one or more of the methodologies discussed herein.

The machine 500 may include processors 510, memory 530, and I/O components 550, which may be configured to communicate with each other via a bus 505. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 515 and processor 520 that may execute instructions 525. The term "processor" is intended to include multi-core processor that may comprise two or more independent processors (also referred to as "cores") that may execute instructions contemporaneously. Although FIG. 5 shows multiple processors 510, the machine 500 may include a single processor with a single core, a single processor with multiple cores (e.g., a multi-core process), multiple processors with a single core, multiple processors with multiples cores, or any combination thereof.

The memory 530 may include a main memory 535, a static memory 540, and a storage unit 545 accessible to the processors 510 via the bus 505. The storage unit 545 may include a machine-readable medium 547 on which are stored the instructions 525 embodying any one or more of the methodologies or functions described herein. The instructions 525 may also reside, completely or at least partially, within the main memory 535, within the static memory 540, within at least one of the processors 510 (e.g., within a processor's cache memory), or any suitable combination thereof, during execution thereof by the machine 500. Accordingly, the main memory 535, static memory 540, and the processors 510 may be considered machine-readable media 547.

As used herein, the term "memory" refers to a machine-readable medium 547 able to store data temporarily or permanently and may be taken to include, but not be limited to, random-access memory (RAM), read-only memory (ROM), buffer memory, flash memory, and cache memory. While the machine-readable medium 547 is shown in an example embodiment to be a single medium, the term "machine-readable medium" should be taken to include a single medium or multiple media (e.g., a centralized or distributed database, or associated caches and servers) able to store instructions 525. The term "machine-readable medium" shall also be taken to include any medium, or combination of multiple media, that is capable of storing instructions (e.g., instructions 525) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 550 may include a wide variety of components to receive input, provide and/or produce output, transmit information, exchange information, capture measurements, and so on. It will be appreciated that the I/O components 550 may include many other components that are not shown in FIG. 5. In various example embodiments, the I/O components 550 may include output components 552 and/or input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instrument), tactile input components (e.g., a physical button, a touch screen that provides location and force of touches or touch gestures, and/or other tactile input components), audio input components (e.g., a microphone), and the like.

In further example embodiments, the I/O components 550 may include biometric components 556, motion components 558, environmental components 560, and/or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 562 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 and/or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine and/or any of a wide variety of peripheral devices (e.g., a peripheral device couple via a Universal Serial Bus (USB)).

Moreover, the communication components 564 may detect identifiers and/or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), acoustic detection components (e.g., microphones to identify tagged audio signals), and so on. In additional, a variety of information may be derived via the communication components 564, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 525 may be transmitted and/or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 525 may be transmitted and/or received using a transmission medium via the coupling 572 (e.g., a peer-to-peer coupling) to devices 570. The term "transmission medium" shall be taken to include any intangible medium that is capable of storing, encoding, or carrying instructions 525 for execution by the machine 500, and includes digital or analog communications signals or other intangible media to facilitate communication of such software.

Furthermore, the machine-readable medium 547 is non-transitory (in other words, not having any transitory signals) in that it does not embody a propagating signal. However, labeling the machine-readable medium 547 as "non-transitory" should not be construed to mean that the medium is incapable of movement; the medium should be considered as being transportable from one physical location to another. Additionally, since the machine-readable medium 547 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of example embodiments of the present disclosure as represented by the appended claims. The specification and drawings are, accordingly, to be regarded in an illustrative rather than a restrictive sense.

The invention claimed is:

1. A method comprising:
accessing, using one or more hardware processors of an application server, a host application written in an application programming language within a source code editor, the host application including a class method that is declared as a database procedure in the application programming language of the host application but whose body is wholly written within the source code editor in a database-procedure language distinct from the application programming language;
compiling, using the one or more hardware processors of the application server, the host application that includes the class method declared in the application programming language but whose body is wholly written in the database-procedure language, the compiling of the host application generating a "create procedure" statement that corresponds to the class method and is included or referenced in a compilation unit also generated by the compiling of the host application; and
executing, using the one or more hardware processors of the application server, the compilation unit that includes or references the "create procedure" statement that corresponds to the class method, the executing of the compilation unit including causing creation of the class method whose body is wholly written in the database-procedure language based on the "create procedure" statement by a database server distinct from the application server, the executing of the compilation unit further causing the database server to execute the class method created thereon.

2. The method of claim 1, wherein the host application is a business application accessing a database on the database server.

3. The method of claim 2, wherein the database comprises an in-memory database.

4. The method of claim 1, wherein the database-procedure language is one of SQLScript or LLANG.

5. The method of claim 1, wherein the database-procedure language is native to the database server.

6. The method of claim 1, wherein the database procedure is created in a database catalog.

7. The method of claim 1, further comprising, prior to the compiling of the host application, performing a syntax check of the host application that includes the class method declared as the database procedure, wherein the syntax check includes causing the database server to create the database procedure and parse the database procedure with a parser specific to the database-procedure language.

8. The method of claim 7, wherein successful creation of the database procedure on the database server during the syntax check is indicative of syntactic correctness of the database procedure.

9. The method of claim 7, wherein the syntax check of the database procedure includes checking dependent objects used inside the database procedure.

10. An application server comprising:
one or more processors;
a memory storing instructions that, when executed by the one or more processors, cause the system to perform operations comprising:
accessing a host application written in an application programming language within a source code editor, the host application including a class method that is declared as a database procedure in the application programming language of the host application but whose body is wholly written within the source code editor in a database-procedure language distinct from the application programming language;
compiling the host application that includes the class method declared in the application programming language but whose body is wholly written in the database-procedure language, the compiling of the host application generating a "create procedure" statement that corresponds to the class method and is included or referenced in a compilation unit also generated by the compiling of the host application; and
executing the compilation unit that includes or references the "create procedure" statement that corresponds the class method, the executing of the compilation unit including causing creation of the class method whose body is wholly written in the database-procedure language based on the "create procedure" statement by a database server distinct from the application server, the executing of the compilation unit further causing the database server to execute the class method created thereon.

11. The application server of claim 10, wherein the operations:

performing a syntax check of the host application that includes the class method declared as the database procedure, the syntax check causing the database server to create the database procedure and parse the database procedure with a parser specific to the database-procedure language.

12. A system comprising:

an application server comprising at least one processor and memory storing instructions that, when executed by the at least one processor of the application server, cause the application server to perform operations comprising:

accessing a host application written in an application programming language within a source code editor, the host application including a class method that is declared as a database procedure in the application pro ramming language of the host application but whose body is wholly written within the source code editor in a database-procedure language distinct from the application programming language;

compiling the host application that includes the class method declared in the application programming language but whose body is wholly written in the database-procedure language, the compiling of the host application generating a "create procedure" statement that corresponds to the class method and is included or referenced in a compilation unit also generated by the compiling of the host application; and executing the compilation unit that includes or references the "create procedure" statement that corresponds the class method, the executing of the compilation unit including causing creation of the class method whose body is wholly written in the database-procedure language based on the "create procedure" statement by a database server distinct from the application server, the executing of the compilation unit further causing the database server to execute the class method created thereon; and a database server in communication with the application server, the database server-comprising at least one processor and memory storing instructions that, when executed by the at least one processor of the database server, cause the database server to perform operations comprising:

in response to the application server executing of the compilation unit that includes a references the "create procedure" statement that corresponds to the class method written in the database-procedure language but declared in the application programming language of the host application:

creating the class method written the database-procedure language based on the "create procedure" statement; and executing the created class method.

13. The system of claim 12, wherein the database server comprises a parser for checking the database procedure for syntactic correctness.

14. The system of claim 13, wherein the memory of the application server further stores a syntax checker for performing a syntax check of the host application, the syntax checker being configured to cause the database server to create the database procedure and parse the database procedure with a parser specific to the database-procedure language.

15. The system of claim 14, wherein the syntax check of the database procedure includes checking dependent objects used inside the database procedure.

16. The system of claim 12, wherein the database-procedure language is one of SQLScript or LLANG.

17. The system of claim 12, wherein the database-procedure language is native to the database server.

\* \* \* \* \*